United States Patent Office 2,853,995
Patented Sept. 30, 1958

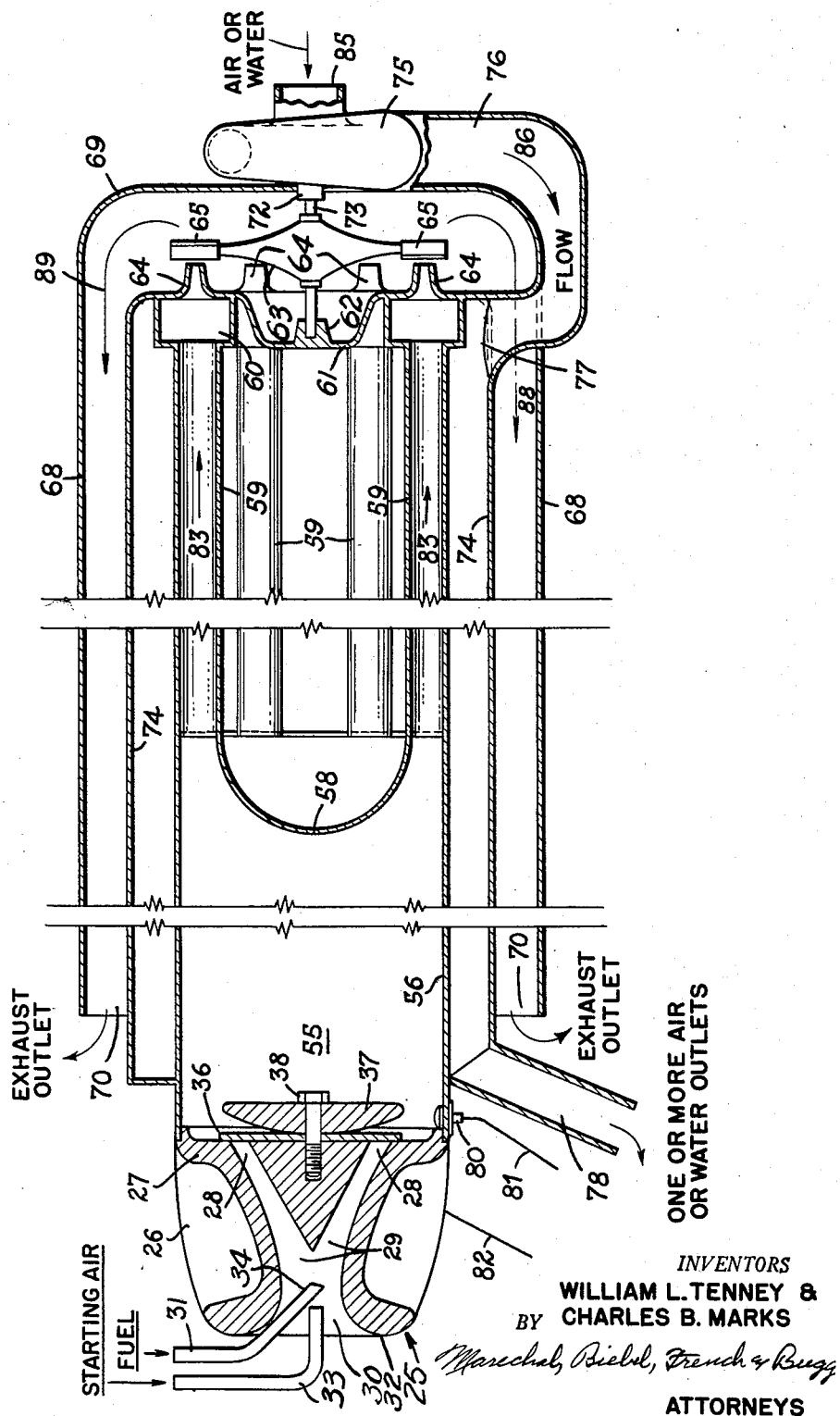

2,853,995

RESONANT INTERMITTENT COMBUSTION HEATERS AND SYSTEM

Charles B. Marks, North Las Vegas, Nev., and William L. Tenney, Dayton, Ohio

Original application July 18, 1950, Serial No. 174,498, now Patent No. 2,715,390, dated August 16, 1955. Divided and this application January 28, 1955, Serial No. 484,762

5 Claims. (Cl. 126—110)

This invention relates to resonant intermittent combustion heaters and systems wherein the primary heating element is a resonant, intermittent combustion type apparatus, the operating cycle of which is similar to that of the propulsive type of engine known as a pulse jet engine.

It is known that engines of the foregoing type are capable of burning large amounts of fuel, and, in so doing, quickly produce intense heat. These engines consist essentially of an elongated tube, one end of which functions as a combustion chamber. The combustion chamber may be of the same diameter as the balance of the tube or of larger or smaller diameter. The operating theory of such engines has, to date, been the subject of controversy but it is known from practical engines, employed as propulsive units, that a charge of air and fuel introduced into the combustion chamber may be ignited by auxiliary means for starting, and thereafter ignition of the succeeding charges is carried out spontaneously.

The products of combustion formed in the combustion chamber have a temperature of the magnitude of at least 2000° F., and following ignition, flow at high speed through the balance of the tube which is known as the exhaust tube. A unique reaction thereupon takes place in this phase of the operation of the engine. The products of combustion from the initial explosion flow at high velocity through the exhaust tube but only a portion of the combustion products from this initial explosion is expelled from the end of the exhaust tube with a jet-like velocity. During the flow of combustion products described a new charge of air and fuel is being drawn into the combustion chamber. After the outward flow of combustion products from the initial explosion the direction of flow of the unexpelled portion of the combustion products reverses and this latter portion then flows toward the combustion chamber where it was formed. The reversal of flow is accompanied by a flow of fresh air into the exhaust tube from the exhaust end thereof. Following the reversed flow of combustion gases and the inflow of fresh air, the second charge of air and fuel drawn into the combustion chamber ignites spontaneously. When the second explosion takes place the combustion products from this second explosion likewise flow through the exhaust tube forcing the fresh air and the remaining combustion products from the first explosion toward the exhaust end of the tube with jet-like velocity. Still another charging of the combustion chamber and reversal of the flow of exhaust gases then occurs as has been described above. The spontaneous ignition of new charges of air and fuel and the rapidly reversing flow of combustion products in the exhaust tube proceeds at substantially fixed frequency for any given pulse jet engine depending upon the design thereof, the operating cycle being dependant on resonant wave conditions controlled by the tube geometry. The charging, combustion, scavenging and exhaust processes are, therefore, cyclic in occurrence and resonant in origin, and since they result from a condition of resonance in the gases which occupy the system while it is operating, i. e. it is the gases which are resonating, the system may be described as resonant in gases. The exhausting of combustion products and fresh air at jet velocity from the exhaust tube provides the thrust which renders the engine a propulsive unit.

The combustion heaters of this invention are similar to the resonant jet propulsion engines described above in that they employ the resonant cyclic operating principles of such engines but differ therefrom in structure, design and function. The resonant exhaust tubes of the devices of the present invention function as heating elements and are made with an extremely great length to diameter ratio, and may be curved or coiled as desired for purposes of compactness and directional heat radiation. The length to diameter ratio of the tubes is in the order of about 35/1 or more, resulting in diminution of the jet propulsion function and development of unique characteristics favorable to heater units.

Among the unique characteristics of these intermittent combustion devices having resonant exhaust tubes of greater length to diameter ratio than efficient for jet propulsion, is the suppression of the loud, sharp and irritating exhaust noise characteristic of pulse jet propulsion engines. The high exhaust tube length to diameter ratio of the heater units of the present invention, which serves to reduce the exhaust propulsive energy and convert it into useful heat, also reduces the exhaust sound energy. Reduction in sound level is, of course, essential for stationary devices such as heaters.

At the same time the intake valve endurance, when mechanical intake valves are used, is multiplied many times. The valve head arrangements shown in certain embodiments of this invention hereinafter disclosed result in a valve endurance in the order of 75 hours or more when used in combination with an exhaust tube length to diameter ratio in the order of 60 to 1. The valve endurance of the same valve head arrangement was found to be only 1½ to 2 hours when utilized with an exhaust tube of 12 to 1 length to diameter ratio, or less, such as is utilized for jet propulsion efficiency. This increase in valve endurance is far out of proportion to that to be expected from the reduction in cycle frequency resulting from increased tube length. With an increase in tube length of approximately 5 times that required for jet propulsion efficiency, and an accompanying decrease in cycle frequency to approximately one-fifth that of the jet propulsion engine, the valve endurance was multiplied in the order of 50 times.

With reference to valve endurance, it should be understood that the invention is not limited to the use of mechanical intake valves, but may employ air inertia or similar non-mechanical valve means such as suggested in our co-pending patent application Serial No. 661,363, filed April 11, 1946, now Patent No. 2,612,749 for Pulse Jet.

In addition to the advantages of reduced exhaust noise and greatly increased intake valve endurance as compared with pulse jet propulsion engines, the intermittent combustion heater units of the present invention exhibit many advantages over heaters of prior types. These advantages include extreme mechanical simplicity, light weight, low cost, compactness and portability, in combination with unusually high heating efficiency.

It is an object of the present invention, therefore, to provide heaters of extreme mechanical simplicity which can be fabricated largely of sheet metal at very low cost. It is also an object of the invention to provide light weight, portable and compact heater units.

It is a further and most important object of the invention to provide heaters capable of converting a maximum amount of the available heat energy of the fuel into useful heat.

The advantages of low cost, mechanical simplicity, light weight and compactness are inherent in the automatic charging, ignition and scavenging resulting from utilization of the resonant intermittent combustion system described above.

The advantage of unusual efficiency results from the employment of certain characteristics of resonant intermittent combustion systems of the type described above, for purposes of improved heat transfer. In this invention a resonant intermittent combustion tube, which exhibits extremely rapid combustion, approaching the condition of combustion at constant volume, is utilized as the heat source.

The inherent advantages of high pressure combustion at constant volume are well known. This extremely rapid combustion, resulting in relatively high peak pressures, results in an extremely high velocity, highly turbulent flow of exhaust gases through the exhaust tube. Instead of constant burning in the combustion chamber a series of explosions takes place. The high temperature gases resulting from these explosions are then expelled through the exhaust tube with great force and velocity and in a highly turbulent state. This flow of high velocity, highly turbulent gases, with consequent "scrubbing" action of a maximum number of heated gas molecules against the exhaust tube surface, results in greater efficiency of heat transfer through the exhaust tube than is had with conventional methods. The exhaust tube is heated to extremely high temperatures, in the order of 1500°–2000° F., and radiates heat at a very high rate from its outer surface.

In addition to the efficiency of heat transfer resulting from the "scrubbing" action of the highly turbulent, high velocity gases, there results another unusual characteristic not attainable in steady flow combustion heating devices. This characteristic, which also contributes to superiority of heat transfer through the exhaust tube, results from the fact that the gas flow through the tube is not uni-directional. In a properly operating resonant intermittent combustion device of the nature described there exists a reversal of gas flow in the tube following each explosion. This rapid, cyclic flow reversal not only creates turbulence but also brings at least a portion of the hot gases generated by each explosion in the combustion chamber into contact with portions of the tube not once but twice or three times. At least a portion of the gases "scrub" the tube not only during their passage from the combustion chamber through the tube toward the exhaust outlet, but also during their reverse motion between each explosition, and again during their motion in the normal direction prior to final ejection. Due to the nature of this cyclic reversing flow process, the regenerative action produced by repeated exposure of given heated gas particles to given portions of the tube wall results in maximum recovery of heat from these particles within a minimum tube length, with correspondingly lower exhaust temperatures and higher efficiency of heat transfer through the tube wall.

Thus, the combustion heaters of this invention are similar to resonant jet propulsion engines in that they employ the resonant, cyclic operating principles of such engines but differ therefrom in that a high proportion of the available energy is converted into useful heat instead of propulsive energy. This result is attained by elongating the exhaust tube of a resonating type pulse jet engine to the point that its length to diameter ratio is such that the mean exhaust velocity is reduced below a level capable of producing worthwhile efficiency as a jet propulsion unit. The engine thus modified ceases to be a thrust producing resonant pulse jet engine and becomes a resonant intermittent combustion heating device.

It is an object of the present invention to provide a resonant intermittent combustion heater and more particularly to provide resonant intermittent combustion heaters and sysems for producing quick, intense heat energy and for utilizing such heat energy. It is also an object of the invention to provide water and air heaters, radiant heaters, circulating water and air heaters and combined resonant intermittent combustion heaters and systems wherein no material thrust is developed or wherein only sufficient thrust is produced to be utilized in the system for circulating the heated medium such as air or water.

Other and further objects of the invention are those inherent in the apparatus herein illustrated, described and claimed.

The invention is illustrated with reference to the drawing, which is a longitudinal sectional view through a suitable form of the invention wherein heat and propulsive energy are produced and propulsive energy directly utilized for circulating the heated medium.

Throughout the drawing corresponding numerals refer to the same parts.

In the form of the invention hereinafter more particularly described, the resonant combustion chamber fuel inlet, valve mechanism and the like may be of any known or suitable type. As examples of the combustion chamber and valve mechanisms, fuel feeding inlets, etc., which may be utilized, reference is made to our copending application Serial No. 649,882, filed February 25, 1946, entitled Pulse Jet Engine, now Patent No. 2,609,660. One of the forms shown in said application is illustrated in Figure 1 and it is understood that the same or any other appropriate form of resonant intermittent combustion chamber, valve mechanism, or one way restricted air inlet such as described in our copending application Serial No. 661,363, filed April 11, 1946, entitled Pulse Jet, now Patent No. 2,612,749, fuel and air inlet, etc., may be utilized.

This application is a division of our copending application Serial No. 174,498, filed July 18, 1950, for Resonant Intermittent Combustion Heater and System, now Patent No. 2,715,390, isued August 16, 1955, which application is in turn a continuation-in-part of application Serial No. 661,364, filed April 11, 1946, now abandoned.

Referring to the drawing, the inlet to the combustion chamber 55 is defined by a casing 25 having a number of fins 26, and including an internal wall or valve plate 27 through which extend a plurality of openings providing valve ports 28. From the valve ports internal inlet passages 29 extend in converging relation into a venturi passage or tube 30. Into the Venturi inlet tube there extends a fuel inlet pipe 31 which is mounted on the entrance mouth 32 of the Venturi. There is also provided starting air inlet pipe 33 which is positioned so as to direct a blast of starting air over the tip 34 of the fuel inlet pipe so as to provide a fuel air mixture for initiating combustion. The valve 36 which rests lightly upon the valve plate or is positioned in very close proximity thereto and the valve clamping and supporting plate 37 are attached by means of a bolt 38. These parts of the apparatus may be of the type shown in said copending Patent No. 2,609,660, above referred to, and will therefore not be further described. The valve mechanism may also be dispensed with and a one way restricted air inlet such as described in said copending Patent No. 2,612,749, be substituted. If desired, fuel and air may be introduced into the combustion chamber through separate inlets as is common practice in pulse jet propulsion engines. Combustion is initiated as described in said applications and the exhaust which contains intensely hot products of combustion is conveyed by way of tube 22 through the medium to be heated.

The combustion chamber 55 is defined by a wall 56 which extends from the internal face of casing 25 and also by a tube plate 58 which is smoothly curved into exhaust heater element tubes 59 which are arranged in cylindrical form around the central axis of the combustion chamber. The tubes 59 may, if desired, be connected together at their outer ends by means of the annular header 60 and to the header there may be attached a plate 61 which serves as a bracket for bearing 62 in which the turbine shaft 73 is journalled. The turbine shaft carries a turbine runner 63. The header 60 is provided with a plurality of exhaust nozzles 64 positioned so as to impinge against the turbine blading 65, which is shown as of conventional construction presenting only edge surfaces to the nozzle 64 and therefore offering minimum interference to the cyclic reversal of flow of exhaust gases through the nozzles 64. The total cross-sectional area of the plurality of nozzles 64 is preferably the same as or somewhat greater than the total cross-sectional area of all of the heater element tubes 59. The combustion chamber and tubes 59 are jacketed by the exterior jackets 74 which with plate 61, serve completely to enclose the heater tubes 59, most of the header 60 and most of the combustion chamber 55. Arranged cylindrically around the shell 74 there is provided an exterior jacket 68 having enclosed end plate 69 and an annular exhaust opening at 70. To the shell 69 there is attached a second bearing 72 which also serves to mount the turbine shaft 73. Upon the turbine shaft 73 there is mounted the impeller of an air or water circulating pump, the scroll casing of which is illustrated at 75. The outlet of pump 75 is connected by channel 76 through the jacket 68 and thence through the port 77 into the chamber formed within the jacket 74. One or more outlets from the jacket 74 are provided at 78.

The device operates as follows: The air or air-fuel mixture is introduced through passages 29 by any suitable mechanism such as that described in our copending patent No. 2,609,660 above referred to, and after passing through the valve mechanism 36 enters the combustion chamber 55 where ignition is initiated by the igniter 80 to which a high tension lead 81 is attached for starting purposes, the opposite high tension lead 82 being grounded to the mechanism as indicated. Once ignition is initiated cyclic combustion continues, and the products of combustion pass along the tubes 59, as indicated by arrows 83, and thence through the header 60 and out of the nozzles 64 where they impinge against the blading 65 of the turbine-runner 63 which is accordingly rotated. The turbine-runner being directly connected to the circulating pump 75 draws air or water through the pump inlet 85 and circulates it in the direction of arrow 86 through the channel 76 and thence into the jacket around manifold 60, heater element tubes 59 and the larger portion of the combustion chamber 55. The heated circulated medium is discharged via the outlet pipe or pipes 78. The exhaust gases after having done their work against the turbine blading 65 pass in the direction of arrows 88 and 89 through the annular space between casings 74 and 68, and accordingly the spent exhaust gases serve additionally to heat the circulated medium. The exhaust gases are finally discharged at the annular orifice 70 from which they may be conducted to the atmosphere or they may be conducted away by suitable exhaust flues.

It has been brought out hereinabove that an essential feature of this invention resides in the construction of a resonant heater element tube having a materially greater length to diameter ratio than that which is employed in efficient resonant pulse jet propulsion engines. This important requirement provides for an efficient recovery of the available energy in the form of heat which is transferred to the resonant heater element tube and becomes available for use, and furthermore, results in a heater unit of the resonant type wherein the exhaust gases produce a negligible amount of thrust.

The importance of this relationship has been established wherein it was found possible to cause a resonant intermittent combustion tube 50 feet in length, with 1¼ inch inside diameter giving a length to diameter ratio of 480 to 1, to exhaust 100° F. mean temperature while burning 5.6 lbs. of gasoline per hour, corresponding to a total heat release in the order of 110,000 B. t. u./hr. Tube surface temperatures in excess of 1600° F. were measured at the combustion chamber during this test, indicating combustion gas temperatures of 2,000° F. and higher prior to passage through the tube and consequent heat transfer. The differential between an initial tube temperature of 1600° F. and a final tube temperature of 100° F., with a heat input of 110,000 B. t. u./hr., demonstrates the tremendous quantity of heat radiated by the tubes of these heater units. A continuation of this test showed exhaust temperatures of 160° F. at 43 feet tube length (l./d.=413 to 1), 230° F. at 33 feet tube length (l./d.=317 to 1), 450° F. at 24 feet tube length (l./d.=230 to 1), and so on up to well over 1,000° F. at tube lengths of two feet or less which give a measure of propulsive efficiency.

A very important feature of the invention lies in the possibility of choosing the most applicable tube length to diameter ratio in accordance with the demands of the application for which the unit is designed. Thus if maximum heat transfer through the tube is required, with minimum waste of heat in the exhaust, a tube of relatively great length to diameter ratio, such as 50 feet length and 1¼ inch diameter (l./d.=480 to 1), will be chosen. If, on the other hand, it is desired to utilize a portion of the exhaust energy for driving auxiliaries such as air or fluid pumps, the tube length to diameter ratio is made correspondingly less in order to retain more energy in the exhaust available for auxiliary uses. A good example of this type of unit is a smoke or fog generator such as that disclosed in application Serial No. 111,308 filed August 19, 1949 of William L. Tenney et al. which utilizes a tube length to diameter ratio in the order of 60:1 for the dual purpose of heating oil and air, and at the same time pumping engine and cabinet cooling air by means of a "jet pump" or exhaust aspirator. The same type of unit can be used as a hot air blower, using the exhaust gas energy to aspirate a flow of cooling air over the engine and cabient surfaces and eject a blast of heated air mixed with combustion gases at the outlet end of the device.

Likewise, by choosing a desirable length to diameter ratio, a suitable portion of exhaust energy can be made available for driving a turbine which in turn can drive air or fluid pumps, or other auxiliaries.

It should be emphasized that in all cases of choice of tube length to diameter ratio for the purposes described herein, the ratio is made sufficiently great so that the exhaust energy is of secondary importance, as for auxiliary use, or is negligible as when no use is to be made of the exhaust. The unit then, in either event for practical purposes, ceases to be a jet propulsion device and utilizes to advantage characteristics of the resonant intermittent combustion process in entirely different fashion than jet propulsion device.

The line of demarcation between jet propulsion devices and devices of the nature described herein, therefore, lies in the increase of the tube length to diameter ratio which subordinates the jet propulsion function to provide the functions and advantages already described. Tests with a 1¼ inch diameter exhaust tube and a 2½ inch diameter combustion chamber have shown that the pounds of fuel consumed per pound of jet thrust per hour increase rapidly as the tube length to diameter ratio is increased beyond quite narrow limits. The efficiency as a jet propulsion device, of course, decreases correspondingly. In accordance with the tests conducted utilizing a 1¼ inch diameter exhaust tube, a length to diameter ratio in excess of about 35:1 showed such a marked loss in jet propulsive efficiency that it was out of the question to use such a unit as a jet propulsion device in comparison with length to diameter ratios of 12:1, and less. The increase in specific fuel consumption as measured in pounds of fuel/pound of thrust/hour was from 2.7 at the short length to diameter ratios to 3.8 at the 35:1 ratio. Conversely the efficiency as a heating unit was still good at length to diameter ratios as great as 500:1. Thus, an exhaust tube length to diameter ratio of about 35:1 may be considered in the range of the lower limit relating to this invention. The upper limit lies beyond 500:1, at whatever point, if any, that the resonant intermittent combustion process can no longer be sustained. There exists today no mathematical means by which this upper limit can be determined.

The determination of exact length to diameter ratios is complicated by the fact that large diameter tubes have thus far, in practical tests, tended to develop best jet propulsive efficiencies at lesser length to diameter ratios than small diameter tubes. However, the lower limit of the length to diameter ratio in resonant intermittent combustion heaters may be taken at about 35 to 1. Another complicating fact in determining length to diameter ratios lies in that the combustion chamber can be made the same diameter as the exhaust tube, in which case there exists no line of demarcation between combustion chamber and exhaust tube from which to start measuring exhaust tube length to diameter ratios. Also, if an enlarged combustion chamber portion is used, it can be made of smaller capacity than necessary, in which case a portion of the fresh charge gases will be inducted into the exhaust tube. The length to diameter ratios herein described are, therefore, determined by measuring the separating point between combustion chamber and exhaust tube based upon the combustion chamber volume at the intake end which is required to contain the fresh charge gases, and to consider the remainder of the tube as exhaust tube.

As many apparently widely different embodiments of this invention may be made without departing from the spirit and scope thereof, it is to be understood that we do not limit ourselves to the specific embodiments herein except as defined by the appended claims.

We claim:

1. In a resonant intermittent combustion heater the combination comprising a combustion chamber having an inlet for air at one end thereof, means for introducing fuel into said combustion chamber, pressure responsive means for controlling the introduction of combustion air through said air inlet located in direct free communication and in direct pressure responsive relation with said combustion chamber providing for substantially unrestricted periodic flow of air through said inlet into said combustion chamber under the action of and in timed relation with the resonant pulsating action of gases in said system while substantially preventing reverse flow of said gases therefrom an elongated exhaust tube heating element opening at one end in unrestricted relation into said combustion chamber and forming with said combustion chamber integral parts of a self-contained system resonant in gases, said exhaust tube heating element having high length to diameter ratio of about 35 to 1 or more to form with said combustion chamber a resonant, self-sustaining, intermittent combustion system wherein automatic charging, ignition and scavenging occurs and a resonant pulsating flow of exhaust gases accompanied by cyclic reversals of flow of said gases is produced in said exhaust tube heating element and a large portion of the propulsive energy of said resonant intermittent combustion system is converted into heat transmitted by said combustion chamber and exhaust tube heating element, a bladed turbine runner journaled and positioned with the blading thereof movable into the path of the exhaust gases from the opposite end of said exhaust tube heating element from said combustion chamber, a fluid circulating pump having an inlet and an outlet connection for driving by said turbine runner, and a housing for fluid to be heated surrounding said combustion chamber and exhaust tube heating elements and having inlet and outlet ports and a connection to said inlet port from said outlet of said pump.

2. In a resonant intermittent combustion heater the combination comprising a combustion chamber having an inlet for air at one end thereof, means for introducing fuel into said combustion chamber, pressure responsive means for controlling the introduction of combustion air through said air inlet located in direct free communication and in direct pressure responsive relation with said combustion chamber providing for substantially unrestricted periodic flow of air through said inlet into said combustion chamber under the action of and in timed relation with the resonant pulsating action of gases in said system while substantially preventing reverse flow of said gases therefrom an elongated exhaust tube heating element opening at one end in unrestricted relation into said combustion chamber forming with said combustion chamber integral parts of a self-contained system resonant in gases, said exhaust tube heating element having high length to diameter ratio of about 35 to 1 or more to form with said combustion chamber a resonant, self-sustaining intermittent combustion system wherein automatic charging, ignition and scavenging occurs and a resonant pulsating flow of exhaust gases accompanied by cyclic reversals of flow of said gases is produced in said exhaust tube heating element and a large portion of the propulsive energy of said resonant intermittent combustion chamber and exhaust tube heating element, jacket means defining a passage in heat exchanging relation with said combustion chamber and said exhaust tube heating element and having an inlet and an outlet for fluid to be heated, a pump arranged to circulate said fluid through said passage, a bladed turbine runner journaled and positioned with the blading thereof movable into the path of the exhaust gases from said exhaust tube heating element, and means forming a driving connection from said turbine runner to said pump for causing said exhaust gases to drive said pump while heating said fluid circulated by said pump through said passage.

3. The combination defined in claim 2 including a plurality of said exhaust tube heating elements extending in circumferentially spaced heat exchanging relation through said passage.

4. The combination as defined in claim 2 including additional jacket means surrounding the first named said jacket means and forming an outer annular passage surrounding said fluid passage and connected to receive said exhaust gases from said turbine runner and to conduct said exhaust gases along the outside of said fluid passage in further heat exchanging relation therewith.

5. The combination as defined in claim 2 including a plurality of said exhaust tube heating elements arranged in circumferentially spaced relation, an annular header connected with said exhaust tube heating elements to receive said exhaust gases therefrom, and a plurality of nozzles forming outlets from said header positioned to discharge said exhaust gases toward said blading of said turbine runner, the total cross-sectional area of said plurality of nozzles being at least as great as the total cross-sectional area of all of said heating elements.

References Cited in the file of this patent

UNITED STATES PATENTS

| | | |
|---|---|---|
| 2,223,856 | Price | Dec. 3, 1940 |
| 2,414,828 | McCollum | Jan. 28, 1947 |
| 2,415,064 | McCollum | Jan. 28, 1947 |
| 2,715,390 | Tenney et al. | Aug. 16, 1955 |